INVENTOR
HARVEY R. CHAPLIN, JR.

June 2, 1964  H. R. CHAPLIN, JR  3,135,480
INTEGRATED PROPULSION SYSTEM FOR RAM WING AIRCRAFT
Filed April 19, 1962  2 Sheets-Sheet 2

INVENTOR
HARVEY R. CHAPLIN, JR.

BY

AGENT.

United States Patent Office 3,135,480
Patented June 2, 1964

3,135,480
INTEGRATED PROPULSION SYSTEM FOR RAM
WING AIRCRAFT
Harvey R. Chaplin, Jr., Arlington, Va., assignor to the
United States of America as represented by the Secretary of the Navy
Filed Apr. 19, 1962, Ser. No. 188,911
21 Claims. (Cl. 244—12)
(Granted under Title 35, U.S. Code (1952), sec. 266)

The invention described herein may be manufactured and used by or for the Government of the United States of America for governmental purposes wtihout the payment of any royalties thereon or therefor.

This invention relates to an integrated propulsion system for a ram wing aircraft, and more particularly, relates to an integrated propulsion system for roll-stabilizing a ram wing aircraft, for protecting its supporting air cushion, and for controlling its transition between relatively stationary flight conditions and other flight conditions.

A ram wing is a wing supported by confining at least part of the free stream air which would ordinarily pass beneath the wing between the wing and the earth's surface so that the confined air, at reduced velocity, forms an "air cushion" at sufficiently high pressure to support or partially support the wing. This phenomenon may sometimes be referred to broadly as "ground effect." Thus, it is the ramming action of the free stream air caught between the lower surface of the wing and ground that provides the vehicle-supporting air cushions. However, "ground effect" as used in the expression "ground effect machines" usually refers to a different type of vehicle wherein a suitable gas (or air) compressor produces high pressure gas that is discharged through nozzles located in the underside of the vehicle to thereby provide a vehicle-supporting air cushion.

The term "ground effect" is generically used herein and therefore refers to the phenomenon of an air cushion supporting abody sufficiently proximate to the earth's surface, whether this phenomenon be produced by the action of a ram wing or by discharge nozzles, or by both simultaneously.

It has been difficult in the design of ground effect machines in general to provide adequately for roll stabilization and "end-plating." by "end-plating" is meant the provision of a protecting curtain or plate of material surrounding the air cushion supporting the machine so that ground (or water) surface irregularities and ambient air currents do not destroy the supporting air cushion. Roll stabilization is particularly difficult in ground effect machines because of the very small friction between the machine and the ground over which it traverses. Consequently, where end plates of solid material are utilized to prevent loss of the air cushion, roll stabilization is even more difficult because of surface impact hazard due to the closeness of the end plates to the ground, and compensatory changes of the attitude of the aircraft for roll stabilization are greatly limited, if not impossible.

According to an embodiment of the present invention there is provided means for propelling a ram wing aircraft whereby part of the air thrust forms fluid end-plates effectively sealing the space between the wing tips and the surface over which the wing traverses, thus realizing air cushion protection to a degree which would be achieved with the use of solid end-plates without incurring the weight, drag, and surface-impact disadvantages of solid end-plates. Another part of the air thrust is divided into two or more balanced pressure areas beneath the wing in order to provide roll stabilization. The direction of air thrust is controlled so that the aircraft may be supported due to ground effect alone, to a combination of ground effect and jet thrust, to jet thrust alone, and also due to the dynamic lift of the wing, thus giving the aircraft according to the invention great versatility and efficiency with the use of only one air compressor, if desired, and without the need for variable pitch compressor blading.

Accordingly, it is an object of this invention to provide aircraft operable by virtue of either air thrust reaction or ground effect, or both simultaneously.

Another object of the invention is to provide in an aircraft of the type described protection for an air cushion supporting the aircraft.

Another object of the present invention is the provision for controlling the transition of an aircraft between ground effect and reactive air thrust positions of operation.

Yet another object of the invention is to provide in an aircraft of the type described, simple and efficient control for both ram wing and hovering flight operations without changing the operating conditions required for air compression and air thrust momentum.

Another object of the present invention is the provision of fluid balance conditions for roll stabilization of a ram wing aircraft.

These and other objects and features of the invention will be better understood by referring to the accompanying drawings in which like reference numerals are used to indicate like parts, and in which.

Figure 1:
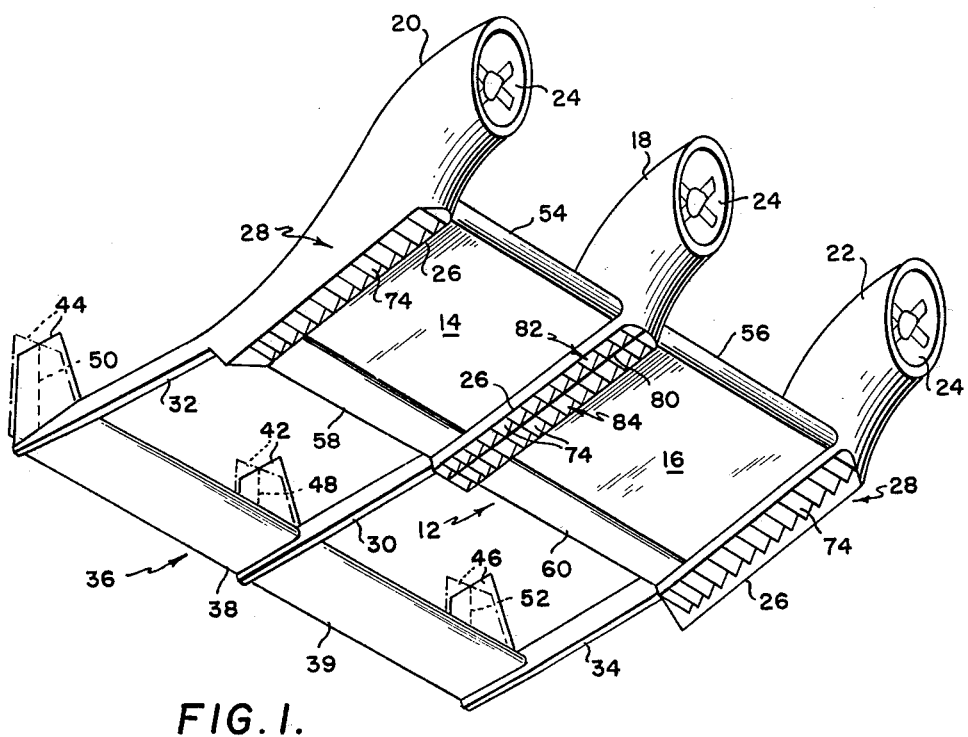
FIG. 1 is a perspective view of an aircraft of the type described as seen from below and according to the invention.

Referring to FIG. 1, an aircraft is shown in the general form of a wing 12 having a longitudinal axis in its primary direction of movement, and having right wing section 14 and left wing section 16 rigidly mounted on a center nacelle 18. A wing tip nacelle 20 is rigidly mounted at the outer end of the ring wing section 14, and a wing tip nacelle 22 is rigidly mounted at the outer end of the left wing section 16. Each of the nacelles 18, 20 and 22 provides a housing for an air compressor.

The nacelles 18, 20 and 22 are streamlined round tubular bodies of similar shape and each of the nacelles has a frontal intake opening 24 canted to face slightly upward. The walls of each of the nacelles 18, 20 and 22 curve gently downwardly toward the rear of the aircraft, the downwardly curving top and bottom walls of each nacelle being flared from each other in a rearward direction, the top wall extending considerably farther back than the bottom wall, and all of said walls being truncated in a substantially horizontal plane to form nozzle 26 in the bottom thereof. Thus, the longitudinal dimension of each of the nozzles 26 is considerably longer than the transverse dimension.

Figure 2:
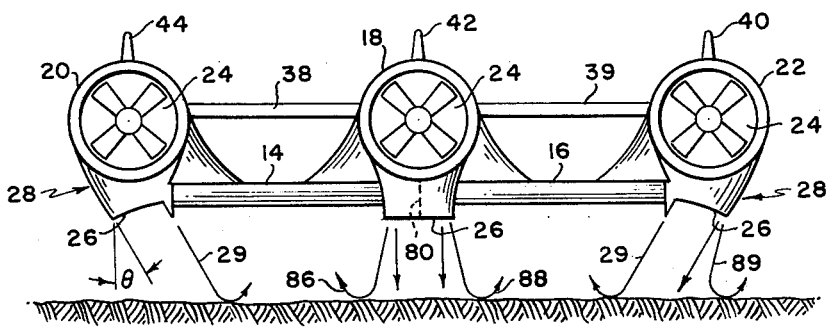
FIG. 2 is a front view of the aircraft of FIG. 1.

As shown in FIG. 2, the transversely outermost walls 28 of the wingtip nacelles 20 and 22 are canted inwardly at an angle $\theta$ to direct air discharge therefrom inwardly beneath the wing 12 as indicated by arrows 29. The angle $\theta$ is preferably between 0 degrees and 30 degrees from the vertical.

Three rigid or semi-rigid upwardly-sloping longitudinal supports 30, 32, and 34 are rigidly secured at their forward ends to the rear upper portions of each of the nacelles 18, 20 and 22 respectively, the support 32 being at the longitudinal center of the wing 12. The supports 30, 32 and 34 extend rearwardly to a multiple unit tail section 36 having a right elevator 38 and a left elevator 39 each selectively rotatable about a transverse hinge 40 rigidly secured to the longitudinal supports 30, 32 and 34. The elevators 38 and 39 may be independently moved by any suitable control means. The tail section 36 also comprises three transversely spaced rudders 42, 44 and 46, each being rotatable in unison by any suitable control means about vertically mounted rods 48, 50 and 52 respectively, each of the rods 48, 50 and 52 being rigidly secured to the longitudinal supports 30, 32 and 34 respectively.

Figure 4:
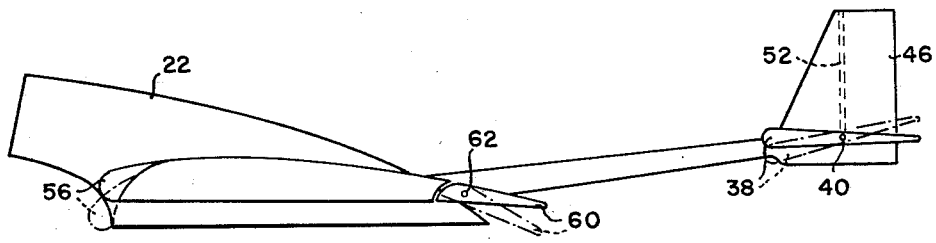
FIG. 4 is a sectional side view of the aricraft of FIG. 1; in outline form.

As shown in FIGS. 1 and 4, the wing sections 14 and 16 are provided with smoothly rounded leading edge flaps 54 and 56 respectively and trailing edge flaps 58 and 60 respectively normally flush with the wing 12 as shown by the solid lines. The leading edge flaps 54 and 56 are slidably mounted on the forward surface of each of the wing sections 14 and 16 respectively and are controllable by any suitable means for up and down movement on the forward surface of the wing sections 14 and 16; and the trailing edge flaps 58 and 60 are rotatably mounted on transverse hinges 62, their movement to flush and down positions being controllable by any suitable means. The lower positions of the flaps 54, 56, 58 and 60 are indicated by dotted lines in FIGS. 4 and 5.

Each of the nacelles 18, 20 and 22 houses an air compressor comprising a fan 66 rotatably mounted in the forward interior portion 68 thereof, said forward interior portion being narrowed to close tolerance with the fan periphery to provide for efficient rearward air moving action therein. Each of the fans 66 is driven by any suitable motor 70 rigidly mounted in each nacelle.

The interior of each of the nacelles 18, 20 and 22 forms a passage 72 into which air is drawn to produce high pressure therein by the action of the fan 66. The air is then expelled at high velocity through the exhaust nozzle 26 for producing thrust for the aircraft.

Figure 3:
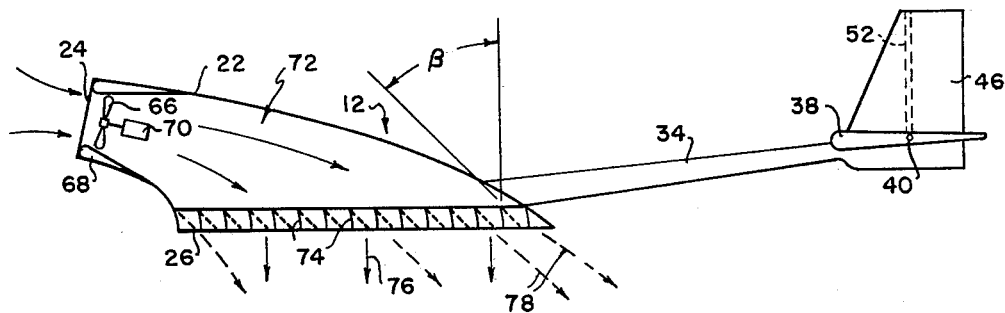
FIG. 3 is a side view of the aircraft of FIG. 1; with certain under parts shown diagrammatically.

Each of the exhaust nozzles 26 is provided with a cascade of spaced cambered guide vanes 74, each vane being mounted in any suitable manner to rotate about a line substantially parallel to the transverse axis of the aircraft. The cascaded vanes 74 may be controlled by any suitable means for rotation in unison for exhausting air from the passage 72 at a variable tangential exhaust angle $\beta$. As shown in FIG. 3 by the solid line arrows 76, when the cascaded vanes 74 of one or more of the nacelles 18, 20 and 22 are orientated to be substantially vertical, the flow of air through the nozzles 26 is expelled downwardly for producing a substantially upward jet reaction and ground effects lift force for the aircraft. When the cascaded vanes 74 are oriented rearwardly toward the horizontal, the expelled air is thrust more nearly backward, as indicated by the dotted line arrows 78, at a larger tangential exhaust angle $\beta$ to produce a jet reaction thrust to move the aircraft forwardly in a horizontal direction, yet producing some downward thrust to provide upward lift in addition to the upward lift produced by the high pressure of air ramming against the lower surface of the wing 12. Moreover, as the vanes 74 are rotated to expel air in a more horizontal direction they tend to restrict or close the exhaust nozzles 26, so that the velocity of the expelled air is increased, thus increasing the thrust. The cascaded vanes 74 may be rotated forwardly toward the horizontal in order to produce negative thrust so that the aircraft may be braked or propelled rearwardly, if desired.

As best seen in FIG. 1, the cascade of controllable guide vanes 74 for the central nacelles 18 is centrally divided by a longitudinal wall 80 into two transverse subsections 82 and 84 of equal width.

The dividing wall 80 divides the flow of air exhausted from the nozzle 26 of the central nacelle 18 into two equal thrust components indicated by the arrows 86 and 88, to produce balanced roll-stabilizing thrust forces on opposite sides of the longitudinal axis of the aircraft.

Figure 5:
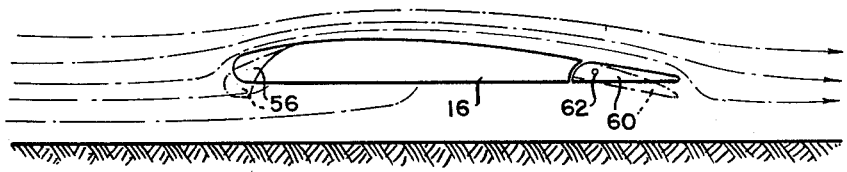
FIG. 5 is an explanatory diagram of flowlines along a wing section according to the invention.

In operation, for producing hovering flight, the leading edge flaps 54, 56, and the trailing edge flaps 58 and 60 are lowered to positions beneath the stream line of the wing 12, as shown in dotted lines in FIGS. 4 and 5, for confining air in the space beneath the wing 12. Air is drawn in through the nacelle intakes 24 by the action of the fan 66 and is exhausted downward through the vertically oriented cascaded vanes 74 in each of the exhaust nozzles 26 at a tangential exhaust angle $\beta$ near zero degrees. Most of this exhausted air flows at relatively low velocity and at relatively high pressure into the space beneath the wing sections 14 and 16 and eventually escapes through the gap between the lowered flaps 54, 56, 58 and 60 and the ground. Also, a relatively small portion of the air from the nozzles 26 of the wingtip nacelles 20 and 22 is turned outward under the influence of the high pressure beneath the wing 12, as indicated by arrows 89 and escapes without entering the space beneath the wing. In hovering flight the wing is held aloft mostly by the action of the high pressure air cushion therebeneath, the remaining force of lift being provided by the direct jet reaction force associated with the momentum of the air thrust from the exhaust nozzles 26 of the nacelles 18, 20 and 22.

For the transition from hovering to forward flight, the cascaded vanes 74 in each of the nacelles 18, 20 and 22 are deflected slowly rearward (in a direction to increase angle $\beta$) thereby causing air to be discharged from the exhaust nozzles 26 with an increasing rearward component, for generating a forward thrust component to propel the aircraft forward. As the speed of the aircraft increases, the quantity of air escaping from the gap between the leading edges 54, 56 and the ground decreases due to ram effect of the free-stream air against the wing 12 and accordingly the leading edge flaps 54, 56, may during this time of acceleration be retracted to their normal positions flush with the surface of the wing 12 as indicated by the solid lines in FIG. 5.

As the speed of the aircraft reaches cruising speed, the high pressure supporting air cushion beneath the wing is increasingly maintained by the ram effect of the free stream air temporarily trapped between the wing and the ground and decreasingly by the effect of high pressure air produced by the air compressor; and at cruising speed, the high pressure beneath the wing is maintained almost entirely by the ram effect of the free stream air. At cruising speed, the air exhausted from the nozzles 26 is mostly utilized for propulsion, and in addition the nozzles in the wing tip nacelles 20 and 22 provide fluid end plating while the divided nozzle in the central nacelle 18 divides the fluid expelled therefrom in a balanced manner to provide roll stabilization.

The streamline pattern of the air passing by the wing is illustrated in FIG. 5. As previously stated, at very low aircraft speeds the leading edge flats 54, and 56 are lowered to positions shown by the dotted lines. In addition, the trailing edge flaps 58 and 60 may be lowered at this time, as shown, thereby reducing the gap between the wing and the ground at the rear of the wing. Due to this restriction imposed by the reduced forward and rear gaps, the air velocity beneath the wing 12 is very low as indicated by the widely spaced air-flow lines, and the pressure is correspondingly high beneath the wing, exerting an upward lift force on the wing. The air exhausted from the nozzles of the wingtip nacelles 20 and 22 form fluid end plates which prevent the high pressure air from leaking past the wingtips so that the excess air which in the absence of a wing would have flowed through the space now occupied by the wing 12 must flow in lines curving upward past the leading edge flaps 54 and 56, and back over the upper surface of the wing. Consequently, the velocity of the air past the leading edge and the upper surface of the wing is high as indicated by the close spacing of the streamlines, and the pressure is very low. The net force of pressure acting on the upper surface of the wing has an upward component which largely cancels out a downward component produced by the drag of the lower surface high pressure. Depending upon the speed of the aircraft, an additional upward lift component is produced by the camber of the wing 12.

The smoothly rounded leading edge of the wing 12 enhances the smoothness of airflow and efficiency of the aircraft in its operating range of speed. Additional control of the aircraft is provided by changing the angular position of the trailing edge flaps 58 and 60 for the purpose of adjusting the aircraft to a height above the ground where the lift is just equal to the weight, and for controlling the location of the aircraft's longitudinal (chordwise) center of lift. The attitude and heading of the aircraft can also be controlled by adjusting the angular positions of the rudders 42, 44 and 46 and, further by the differential application of power to the wingtip nacelles 20 and 22, and still further by differential control of the cascaded vanes 74 of each of the respective nacelles 18, 20 and 22. All of the controls may be actuated in any suitable manner from a cockpit (not shown) located on the aircraft.

Moreover, by the provision of air compressors of sufficient power in the nacelles 18, 20 and 22, the aircraft according to the invention may be operated in free flight, i.e. without any ground effects. Although in free flight the aircraft will have a lower lift/drag ratio than the aircraft when subjected to ground effects, the lift/drag ratio is nevertheless comparable to that of conventional aircraft having the same aspect ratio.

Of course, the aircraft according to the invention may be made tailless if the flight speed is confined to a range wherein pressure distribution on the wing itself as affected by variations in altitude and attitude is sufficient to stabilize the motion of the wing. Moreover, the number of nacelles may be varied, as, for example, instead of one divided central nacelle, two inner symmetrically mounted nacelles may be used. Also, two or more wings each having nacelles mounted thereon mounted in tandem arrangement on a rigid or semi-rigid frame, or the use of a greater number of smaller tandem-mounted nacelles disposed in balanced fashion about the longitudinal aircraft axis, may be utilized in carrying out the invention. Furthermore, if desired, not all of the cascaded vanes in the various nacelles, such as nacelles 18, 20 and 22 shown in the drawings, need be movable. For example, the vanes of the wing-tip nacelles 20 and 22 may be fixed to produce at an angle of thrust corresponding to the designed cruising speed of the aircraft, and speed variations may be achieved by controlling the tangential exhaust angle of the nozzle of the central nacelle 18 only. Moreover, if desired further propulsion units for pure horizontal thrust may be located on the aircraft.

Obviously many modifications and variations of the present invention are possible in the light of the above teachings. It is therefore to be understood that within the scope of the appended claims the invention may be practiced otherwise than as specifically described.

What is claimed is:
1. In an aircraft:
    (a) airfoil means having a longitudinal axis in the direction of forward motion of the aircraft said airfoil means having elements providing at sufficient velocity lift for maintaining the aircraft in free flight;
    (b) said airfoil means having a plurality of longitudinal nozzles located at discrete portions of the underside thereof, and said airfoil means having a nozzle located on the underside of each portion at each extremity of said airfoil means;
    (c) air compressor means fluidly coupled to each of said nozzles said air compressor means having essentially longitudinal-flow intakes located externally of the working surfaces of said airfoil means;
    (d) a plurality of vanes mounted in said nozzles and movable in unison for varying the direction of air thrust from said nozzles;
    (e) movable transverse flap means mounted on said airfoil means for confining at least a portion of the air beneath said airfoil means and for simultaneously increasing the effective air flow surface of said airfoil means;
    (f) the air beneath said airfoil means being restrained from escape in transverse directions therefrom by the action of air downwardly discharged from said extremely located nozzles.

2. Apparatus as defined in claim 1 wherein each extremely located nozzle comprises a longitudinal outer wall canted inwardly.

3. Apparatus as defined in claim 1 wherein said nozzles are disposed on said airfoil means for balanced air thrust about the central longitudinal axis of the aircraft.

4. Apparatus as defined in claim 1 wherein at least one of said nozzles is located on the longitudinal axis of said aircraft, and a longitudinal wall is mounted in said nozzle for dividing the air discharged therefrom into thrust components balanced about the longitudinal axis of the aircraft.

5. Apparatus as defined in claim 1, wherein said flap means comprises a leading edge flap slidably mounted for up and down movement on the leading edge of said airfoil means and a trailing edge flap rotatably mounted for movement at the trailing edge of said airfoil means.

6. Apparatus as defined in claim 4, but further comprising a tail section, and longitudinal support means for connecting said tail section to said airfoil means.

7. Apparatus as defined in claim 1, wherein said airfoil means comprises at least one continuous wing.

8. In an aircraft:
    (a) an airfoil wing having an opening located in the center portion thereof;
    (b) a tubular body longitudinally mounted at said opening in the center portion of said wing;
    (c) a tubular body mounted at each wingtip;
    (d) each of said tubular bodies being arranged for downward discharge;
    (e) air compressor means located in each of said tubular bodies;
    (f) movable means mounted in at least one of said tubular bodies for varying the direction of flow of air discharged therefrom;
    (g) and means mounted in said centrally located tubular body for dividing the air discharged therefrom into thrust components on each side of the longitudinal axis of said aircraft.

9. Apparatus as defined in claim 8, but further comprising means located in each of said wingtip tubular bodies for directing at least a portion of the air discharged therefrom inwardly toward the longitudinal axis.

10. Apparatus as defined in claim 9, but further comprising a tail section and longitudinal support means connecting said tail section to said tubular bodies.

11. In an aircraft:
    (a) a central nacelle;
    (b) first and second wing sections rigidly secured to said central nacelle and extending outwardly therefrom;
    (c) first and second outer nacelles respectively rigidly secured to the tips of said first and second wing sections;
    (d) each of said nacelles having a frontal intake opening and an exhaust nozzle arranged to discharge air beneath said aircraft;
    (e) air compressor means mounted in each of said nacelles;
    (f) and a longitudinal dividing wall mounted in the exhaust nozzle of said central nacelle for providing balanced air thrust therefrom about the longitudinal axis of said aircraft.

12. Apparatus as defined in claim 11, but further comprising movable vane means mounted in at least one of said nozzles for varying the direction of thrust of air discharged therefrom.

13. Apparatus as defined in claim 11, but further comprising a cascade of unisonly movable vanes mounted in each of said nozzles.

14. Apparatus as defined in claim 13, wherein each of said unisonly movable vanes is rotatably mounted about a substantially transverse axis.

15. Apparatus as defined in claim 13, but further comprising a tail section, said tail section comprising a longitudinal support secured to the rear portion of each of said nacelles, an elevator rotatably mounted between each of said supports, and a rudder rotatably mounted on each of said supports.

16. An aircraft of a type described comprising:
(a) an airfoil wing having a longitudinal central axis;
(b) a tubular nacelle located longitudinally on said wing and on each side of said axis, each nacelle having a longitudinal air-discharge nozzle at the lower side of said wing;
(c) an air compressor in each nacelle;
(d) said nacelles having means directing air discharged from said nozzles inwardly toward said axis.

17. An aircraft as defined in claim 16 wherein each said nacelles has an outer wall at its nozzle, and said means comprises said walls directed inwardly.

18. An aircraft as defined in claim 16 but further characterized by adjustable air-deflecting flaps at the leading and trailing edges of said wing.

19. An aircraft as defined in claim 16 wherein each of said nozzles has a plurality of spaced air-deflecting vanes therein.

20. An aircraft as defined in claim 17 but further characterized by adjustable air-deflecting flaps at the leading and trailing edges of said wing.

21. An aircraft of a type described comprising:
(a) an airfoil wing having a longitudinal axis;
(b) a tubular nacelle mounted longitudinally along said wing and having an air-discharge nozzle at the lower side of said wing along said axis, said nozzle having a central longitudinal wall;
(c) and a plurality of spaced air-deflecting vanes in said nozzle disposed on both sides of said wall.

References Cited in the file of this patent

UNITED STATES PATENTS

| | | |
|---|---|---|
| 2,387,627 | Warner | Oct. 23, 1945 |
| 3,077,321 | Dunham | Feb. 12, 1963 |
| 3,082,976 | Dornier | Mar. 26, 1963 |

FOREIGN PATENTS

| | | |
|---|---|---|
| 1,263,704 | France | May 2, 1961 |